United States Patent [19]

Corti

[11] Patent Number: 5,712,533
[45] Date of Patent: Jan. 27, 1998

[54] POWER SUPPLY CIRCUIT FOR AN ELECTROLUMINESCENT LAMP

[75] Inventor: Damien Corti, Neuchâtel, Switzerland

[73] Assignee: Eta SA Fabriques d'Ebauches, Grenchen, Switzerland

[21] Appl. No.: 444,010

[22] Filed: May 18, 1995

[30] Foreign Application Priority Data

May 26, 1994 [CH] Switzerland .................. 01 628/94

[51] Int. Cl.[6] .................... H05B 33/00; H05B 33/02
[52] U.S. Cl. .................... 315/169.3; 315/307; 345/76; 345/77; 345/212
[58] Field of Search .................... 315/169.3, 219, 315/307; 345/76, 77, 212

[56] References Cited

U.S. PATENT DOCUMENTS

| | | | |
|---|---|---|---|
| 4,247,854 | 1/1981 | Carpenter et al. | 315/169.4 X |
| 5,317,497 | 5/1994 | Belek | 363/40 |

FOREIGN PATENT DOCUMENTS

| | | |
|---|---|---|
| 359245 | 6/1990 | European Pat. Off. . |
| 2196805 | 5/1988 | United Kingdom . |
| WO8605304 | 12/1986 | WIPO . |

*Primary Examiner*—Robert Pascal
*Assistant Examiner*—Arnold Kinkead
*Attorney, Agent, or Firm*—Sughrue, Mion, Zinn, Macpeak & Seas, PLLC

[57] ABSTRACT

The power supply circuit for an electroluminescent lamp (7) comprises a transformer with two windings (4, 6). The primary winding (4) of the transformer is supplied cyclically by a battery via the intermediary of an "H" bridge. The use of an "H" bridge ensures that the current circulating in the primary winding (4) has no continuous component, which optimises the rates of transmission of electric energy from the primary (4) to the secondary of th transformer.

9 Claims, 3 Drawing Sheets

POWER SUPPLY CIRCUIT FOR AN ELECTROLUMINESCENT LAMP

BACKGROUND OF THE INVENTION

The present invention concerns a power supply circuit for an electroluminescent lamp and, in particular, a power supply circuit for an electroluminescent lamp intended to operate in a timepiece supplied by a battery.

It is known, notably from U.S. Pat. No. 3,749,977, that electroluminescent lamps have substantially the same electrical properties as capacitors and that, consequently, the energy required to supply one of these electroluminescent lamps may be reduced if it is connected to an inductor in a resonant circuit whose source is adjusted to the resonant frequency.

The alternating voltage which must be supplied to the terminals of an electroluminescent lamp in order to supply it is generally several tens of volts, typically 75 volts from peak to peak. If one wishes, for example, to use a battery nominally supplying a voltage of 1.5 or 3 volts as the source of energy, one will have to use voltage increasing means which produce a considerable voltage gain.

The means for increasing the voltage supplied by a battery can of course be formed by a transformer whose primary winding is supplied intermittently by the battery and whose secondary winding forms, in conformity with the above, the inductance of an LC resonant circuit whose capacity is formed by the electroluminescent lamp. In these circumstances, by selecting the ratio between the number of coils in the primary winding and in the secondary winding of the transformer, one can adjust the transformer's gain and thus the voltage at the terminals of the electroluminescent lamp.

U.S. Pat. No. 4,208,869 discloses several power supply circuits of the above type. In each of these circuits, the primary winding of the transformer is connected to the terminals of the battery in series with a switching transistor, and control pulses of an appropriate frequency, supplied to the switching transistor gate, control the current through the transformer primary winding.

A configuration of this type has disadvantages. In a circuit of this type, the connections of the primary winding and the switching transistor to the battery only allow the current to circulate in one direction in the transformer primary winding. In these circumstances, the current circulating in the primary winding of the transformer is not, strictly speaking, alternating. This current may, in fact, be broken down into the sum of a truly alternating component and a continuous component. Since the continuous component cannot induce voltage in the transformer's secondary winding, it results in pure loss.

SUMMARY OF THE INVENTION

An object of the present invention is thus to provide a power supply circuit for an electroluminescent lamp comprising a transformer whose primary winding may be supplied by a battery, and in which the current circulating in the primary winding does not include a continuous component.

Another object of the present invention is to provide a power supply circuit for an electroluminescent lamp able to operate with a transformer having a lower voltage gain.

The present invention thus concerns a power supply circuit for an electroluminescent lamp intended to be supplied by a continuous voltage source and notably by a battery, including a transformer comprising, on the one hand, a primary winding and, on the other hand, a secondary winding intended to be connected between two electrodes of said electroluminescent lamp so as to form a resonant LC loop, and connecting (commutation) means responding to a substantially periodic control signal to apply said continuous voltage to said primary winding so as to generate an electric current of substantially periodic intensity in the latter, characterised in that the connecting (commutation) means are intended to respond to said control signal by switching cyclically between a first state where said current circulates in the primary winding in a first direction and a second state where said current circulates in the primary winding in the other direction.

Thanks to the features referred to above, since the direction of the circulation of the current in the primary is reversed in a cyclical manner, the latter is truly alternating and has no continuous component. In these circumstances, the rate of transmission of electric energy from the primary winding to the secondary winding is optimised.

Another advantage of the present invention is that the variation dV of the voltage between the two ends of the primary winding observed during the passage of the connecting means from the first state to the second state or vice versa is equal to twice the potential difference measured at the terminals of the voltage source. In these circumstances, the transformation ratio required from the device is reduced by half in comparison to a device made, for example, in accordance with the teachings of U.S. Pat. No. 4,208,869 mentioned above. As a result of the present invention, one can thus use a transformer having a lower voltage gain and thus, for example, a secondary winding comprising fewer coils. In horological applications, the available space is very restricted and one normally uses very thin wire, which has a non negligible ohmic resistance, for the secondary winding of the transformer. A reduction in the number of coils thus allows a thicker wire to be used and, consequently, a more efficient transformer to be obtained.

According to a preferred embodiment of the present invention, the enslaving means comprise a capacitor interposed between one of the terminals of the primary winding and the connecting means, the level of potential at the particular armature of said capacitor which is connected to said primary winding being used as control signal for the connecting means.

According to this preferred embodiment, the supply circuit has a double resonance, a resonance in the loop formed by the secondary winding and the electroluminescent lamp and a resonance in the loop comprising the primary winding and the capacitor connected to the latter. By selecting a capacitor of adequate capacity, one can easily give the resonant frequency of the primary winding a value substantially equal to the resonant frequency of the secondary winding. Thus, in a well known way, the coupling of these two resonances becomes important and the whole circuit is enslaved to a global resonant frequency which is practically equal to the resonance frequency of the secondary winding.

Further, when resonance occurs, the induction flux produced by the current circulating in the secondary winding induces a voltage in the primary winding which is in phase opposition to the voltage supplied via the intermediary of the connecting means. In these circumstances, the current circulating in the primary winding is minimised as is the consumption.

Another advantage of this preferred embodiment of the present invention is that, since the feedback loop of the enslaving means is achieved on the primary winding of the transformer, the winding direction of the transformer windings is unimportant. Since transformers used in the horological field have to be of extremely small size, the fact of not having to take account of a polarity for the windings thus enables the assembly operations of the supply circuits to be considerably simplified.

Yet another advantage of this preferred embodiment is that, as will be seen below, it is not very susceptible to the manufacturing faults of armatures which connect the two windings of the transformer inductively.

Other features and advantages of the present invention will appear more clearly upon reading the following description, given solely by way of non limiting example and made with reference to the attached drawings in which:

DESCRIPTION OF THE PREFERRED EMBODIMENTS

Figure 1:
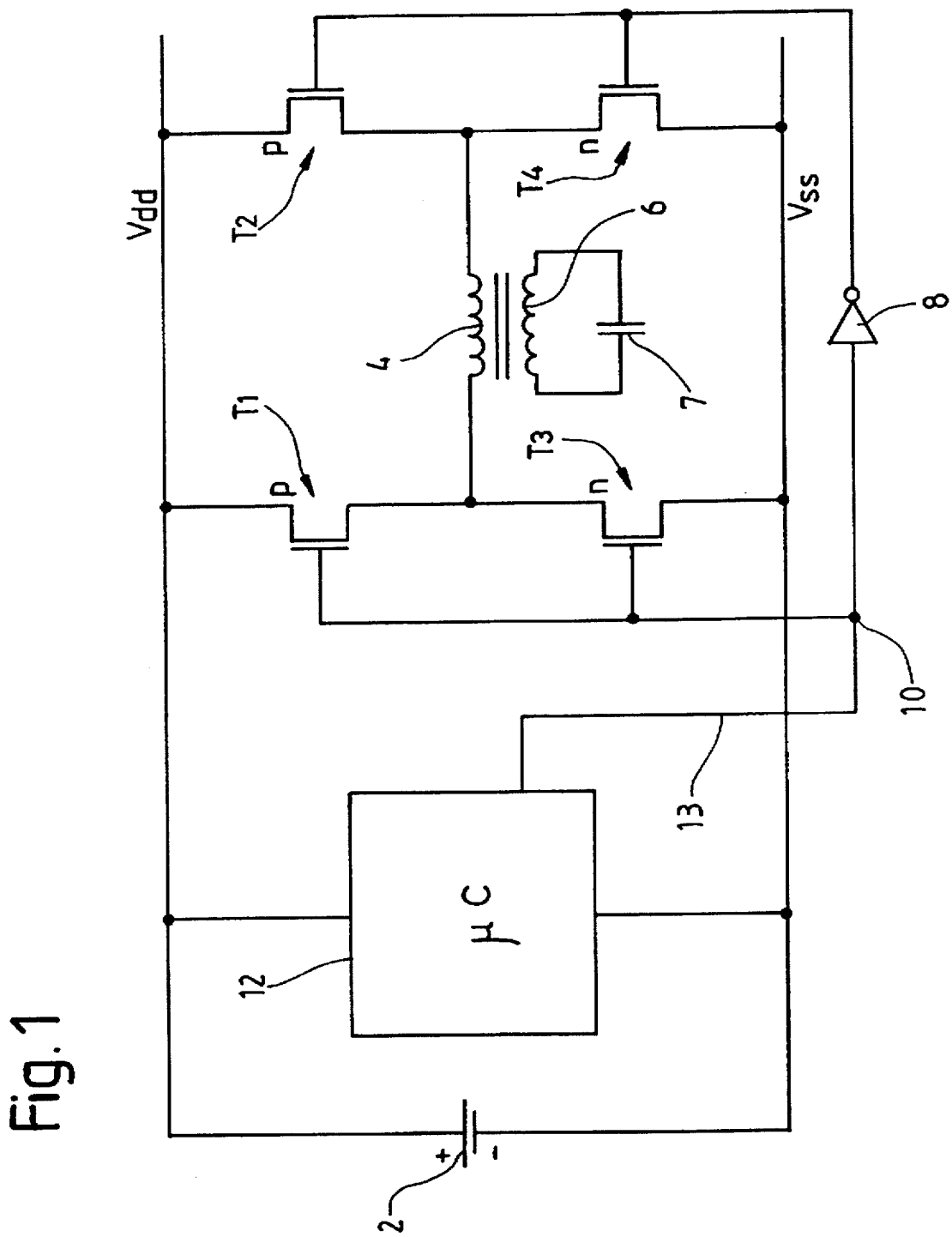
FIG. 1 is the diagram of a power supply circuit of an electroluminescent lamp according to a first embodiment of the present invention.

FIG. 1 shows a first example of a power supply circuit of an electroluminescent lamp according to the present invention. In this example, the energy required for the operation of the circuit is supplied by a battery referenced 2. When the power supply circuit is incorporated into an electronic watch, battery 2 may advantageously also assure the supply of energy to the other circuits of this watch.

The power supply circuit comprises first of all a transformer with two windings referenced 4 and 6 respectively. According to the present invention, the terminals of secondary winding 6 are each connected to one of the electrodes of an electroluminescent lamp which is symbolically represented by a capacitor referenced 7 in FIG. 1. Also according to the invention, primary winding 4 of the transformer is connected to the terminals of battery 2 via the intermediary of connecting means.

In the present example, the connecting means are formed by two P type switching transistors referenced T1 and T2 and by two N type switching transistors referenced T3 and T4. These transistors are connected together to form a particular bridge structure. This particular type of bridge, called an H bridge, is, in itself, well known to the man skilled in the art. H bridges are used notably in stepping micromotors power supply circuits.

In the present example, the drains of transistors T1 and T3 are connected, together, to a terminal of primary winding 4 and the drains of transistors T2 and T4 are connected together to the other terminal of winding 4. The sources of P type transistors T1 and T2 are connected to the positive terminal of battery 2 and the sources of N type transistors T3 and T4 are connected to the negative terminal of battery 2. Finally, the gates of transistors T1 and T3 are connected, together, to a connection node 10 and the gates of transistors T2 and T4 are connected to this same node 10 via a inverter 8.

The circuit of FIG. 1 also comprises control means intended to supply a control signal for the four switching transistors of the H bridge. In the present example, these control means are formed by a micro-manager (or micro-controller) 12 which is used with a time base and which comprises a control output connected to the gates of transistors T1 and T3 via connecting node 10 and to transistors T2 and T4 via this same node 10 and inverter 8. In the case where the power supply circuit is incorporated into an electronic timepiece, micro-manager 12 may advantageously be provided to control other functions of this watch as well.

A watch incorporating the power supply circuit will also include, preferably, a control device (not shown) able to be activated by the wearer of the watch in order to start and to stop the power supply circuit for electroluminescent lamp 7. When the power supply circuit is started, micro-manager 12 emits a square control signal corresponding to a succession of high and low logical states to switching transistors T1 to T4. The frequency of this control signal is intended to be substantially equal to the resonant frequency of the LC loop formed by the secondary winding of the transformer and electroluminescent lamp 7.

Since the gates of transistors T1 and T3 are directly connected to node 10, the latter receive simultaneously the succession of high and low logical states provided by micro-manager 12. Since transistors T2 and T4 are connected to node 10 via the intermediary of inverter 8, the logical signal received by their gates is in phase opposition to that received by transistors T1 and T3. Finally, since transistors T1 and T2 are of type P and transistors T3 and T4 are of type N, it will be understood that, when the logical signal provided by the micro-manager is at the high logical state, winding 4 of the transformer is supplied by battery 2 via the intermediary of transistors T1 and T4, the current thus circulating in one direction, and that, when the logical signal is at the low state, winding 4 is supplied by battery 2 via the intermediary of transistors T2 and T3, the current thus circulating in the other direction.

As a result of the arrangement which has just been described, the alternating voltage which supplies primary winding 4 of the transformer has a peak to peak value which is equal to twice the potential difference at the terminals of battery 2. As a result of this feature, the transformation ratio required from the transformer is reduced in comparison to the circuits of the prior art. Further, since the operating time of the device is also divided between half-periods when the current circulates in one direction and half-periods when the current circulates in the other direction, this current does not have a continuous component.

FIG. 1 also shows that electroluminescent lamp 7 forms with secondary winding 6 an LC loop. In these circumstances, if the frequency of the control signal produced by micro-manager 12 is substantially equal to the resonant frequency of this LC loop, the voltage at the terminals of electroluminescent lamp 7 is substantially equal to the voltage induced in secondary winding 2, this voltage being determined by the transformation ratio of the transformer.

Figure 2:
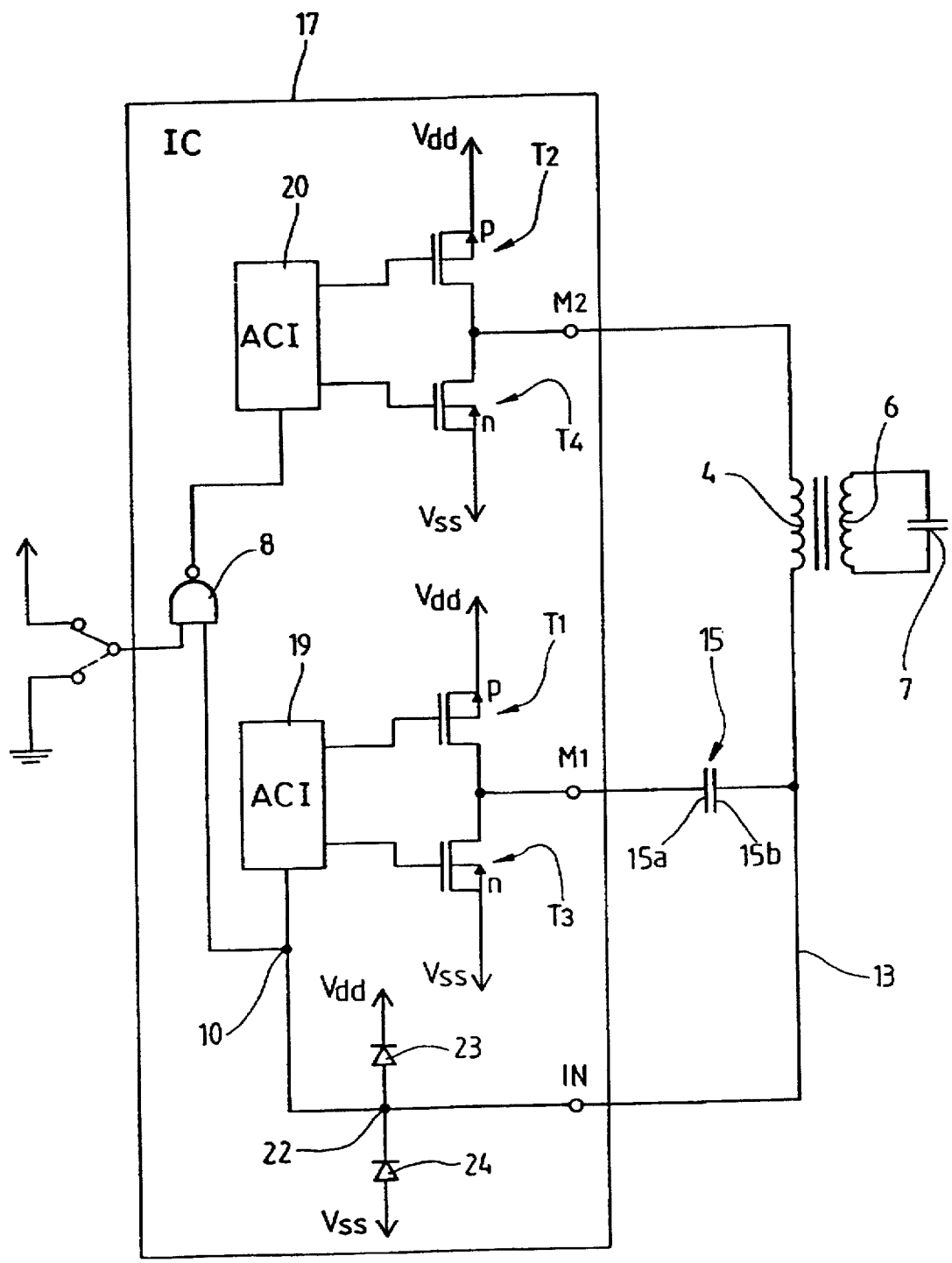
FIG. 2 is the diagram of a power supply circuit of an electroluminescent lamp according to a second embodiment of the present invention.

FIG. 2 shows a second embodiment of the circuit of the present invention. The components of the circuit of FIG. 1 which are again found in FIG. 2 are marked with the same reference numbers.

The components forming the power supply circuit of an electroluminescent lamp shown in FIG. 2 are intended preferably to be realised in an integrated circuit chip. Only a capacitor referenced 15 and the transformer comprising windings 4 and 6 are, in this example, realised in the form of components outside the integrated circuit chip. Winding 4 and capacitor 15 are connected to each other in series and coupled to the chip by two connection terminals referenced M1 and M2. In FIG. 2, the edge of the integrated circuit chip is represented by a frame referenced 17. It can also be seen in FIG. 2 that the chip comprises a third connection terminal referenced IN. This terminal is provided to receive the control signal for the H bridge via a feedback line whose other end is connected to an armature 15b of capacitor 15.

Like the circuit shown in FIG. 1, the circuit of FIG. 2 can be supplied notably by a battery whose voltage determines the difference between the two supply potentials (conventionally called Vdd and Vss). In order to avoid overburdening the drawing, the battery and the conductors which supply the different components of the circuit have not been shown.

As in the preceding example, the transformer comprises a secondary winding 6, whose terminals are each connected to one of the electrodes of electroluminescent lamp 7 to be supplied, and a primary winding 4 connected to the two halfs of an H bridge.

In the example in FIG. 2, one can see that, contrary to the case in the preceding example, each half of the H bridge comprises, in addition to the two switching transistors (T1, T3 and T2, T4 respectively) a module represented by a rectangular box (referenced 19 and 20 respectively). Module 19 is interposed between node 10 and the gates of transistors T1 and T3, while module 20 which is identical to module 19, is interposed between reverser 8 and the gates of transistors T2 and T4.

The function of modules 19 and 20 is to prevent the P type transistor and the N type transistor which form one of the halves of the H bridge being conductors at the same time at the moment when the control signal provided by the enslaving means passes from the low logical state to the high logical state (or vice versa). The voltage required to change the state of a switching transistor is never defined with perfect precision, and furthermore the change of state of a transistor is never instantaneous. In these circumstances, if precautions are not taken, current will be dispersed directly in pure loss between the P type transistors and the N type transistors without passing through winding 4. In order to avoid this problem, each of modules 19 and 20 is intended, at each transition, to wait until the conducting transistor has had time to block itself before making the non conducting transistor conduct. The man skilled in the art already knows transverse current suppressing modules of this type by the name of ACI (Anti Current Inverter).

It should however be noted that the ACIs are definitely not an essential feature of the present example, since the circuit of FIG. 2 may very easily be adapted to work without the ACIs.

The control signal supplied to the ACIs is generated by the enslaving means which, in the present example, are formed by a feedback line referenced 13 which is connected to terminal IN of chip 17. On the other hand FIG. 2 shows that capacitor 15 which has already been discussed is connected in series with winding 4 to the two halfs of the H bridge. More precisely, one of the armatures 15a of capacitor 15 is connected to a first half of the H bridge via terminal M1 and the other armature 15b is connected to one of the ends of winding 4.

The presence of capacitor 15 and feedback line 13 transforms the assembly formed by the H bridge and the primary winding of the transformer into an oscillating circuit. Since capacitor 15 is mounted in the "horizontal bar" of the H, it receives all the current circulating between the two halfs of the bridge. The effect of this current is to charge capacitor 15 so that the potential of its armature 15b which is connected to winding 4 gradually approaches the potential supplied, via terminal M2, to the other end of winding 4. The potential at armature 15b of the capacitor is transmitted by feedback line 13 to node 10 and thus to the two ACIs. At the moment when the potential transmitted by line 13 reaches the value required to switch the ACIs, the polarity in the H bridge is reversed and the potential of armature 15b is abruptly shifted by a quantity equal to the potential difference between Vdd and Vss. Then, the current circulating in the H bridge again gradually causes the potential of armature 15b to approach that present at terminal M2, until the potential of armature 15b reaches the value required to switch the ACIs again.

It will be understood that, in this example, the oscillating frequency of the current in primary winding 4 depends on the one hand on the induction characteristics of the transformer and on the other hand on the capacity of capacitor 15. If the value of the capacity of capacitor 15 is judiciously chosen, the variations in potential at armature 15b of capacitor 15 are, when resonance occurs, in phase with the variations in potential at one of the electrodes of electroluminescent lamp 7. When resonance occurs, capacitor 15 behaves thus like the mirror capacity of the capacity of electroluminescent lamp 7 itself.

It can also be seen in FIG. 2 that feedback line 13 passes through a node referenced 22 to which two diodes 23 and 24 are connected in a known manner. The function of diodes 23 and 24 is to protect the integrated circuit from overvoltage.

There are many advantages related to the use of a circuit enslaved by a feedback line transmitting a signal issued from the primary winding of the transformer. First of all, the fact of using a feedback line enables one to dispense with the external oscillator which is used notably in the embodiment described in FIG. 1. On the other hand, the fact that the signal transmitted by feedback line 13 is issued from the transformer primary winding means that the winding direction of the latter's windings is unimportant.

Another advantage of using a feedback line slave circuit is that this enslavement means that the correct operation of the circuit according to the invention depends very little upon the resonant frequency value.

It is known that the resonant frequency of the transformer secondary winding depends notably upon the induction coefficients in the transformer and thus, in particular, upon the quality of the armatures, made in a highly magnetic susceptibility material, which, in the conventional manner, inductively connect the two windings of the transformer. In horological applications, armatures for windings must be of extremely small dimensions. In these circumstances, conventional mass production methods mean that slight variations in performance cannot be avoided between one sample and the next. It is thus difficult to avoid a slight variation in resonant frequency between two samples of a same supply circuit.

Since the resonant frequency may thus be different for each sample of the power supply circuit, a control signal of predetermined frequency will only be able to excite a small proportion of circuit samples when resonance occurs.

In the example which has just been described in connection with FIG. 2, the resonant frequency produced in the primary by the enslaving means must correspond to the resonant frequency of the secondary winding. However, the faults which are produced in the armatures generally affect all the induction coefficients of the transformer in the same manner. In other words, these faults influence the resonant frequency of the primary winding and that of the secondary winding in a same proportion. In these circumstances, the value which must be given to the capacity of capacitor 15 to reconcile the primary winding with the secondary winding depends almost solely upon the ratio between the number of coils in the two windings and practically not at all upon the magnetic features of the armatures.

A third advantage of the embodiment of FIG. 2 is that the presence of capacitor 15 in the loop of the primary winding prevents any continuous flow of charges between one terminal of the battery and the other. In these circumstances, it is sufficient to block the cyclical switching of the switching connecting means to deactivate completely the power supply circuit according to the invention, and the presence of capacitor 15 ensures that the consumption of the circuit when at rest is virtually zero. In order to put this latter advantage to use, inverter 8 which is visible in FIG. 1 is replaced in FIG. 2 with a NAND gate also referenced 8. The second input of the NAND gate (that which does not receive the enslaving signal) receives a logical control signal enabling the supply circuit to be activated or deactivated. When the control signal at the second input of NAND gate 8 is at level "1", the latter behaves like a conventional inverter for the signal at its first input. When the control signal at the second input is at level "0", the NAND gate supplies a logical "1" at its output whatever the level of the signal at its first input. The connecting means can therefore no longer switch and the power supply circuit is thus de-activated.

Further, since no line connects, in this embodiment, the secondary winding of the transformer to another part of the circuit, it is possible to earth one of the electrodes of the electroluminescent lamp.

Figure 3:
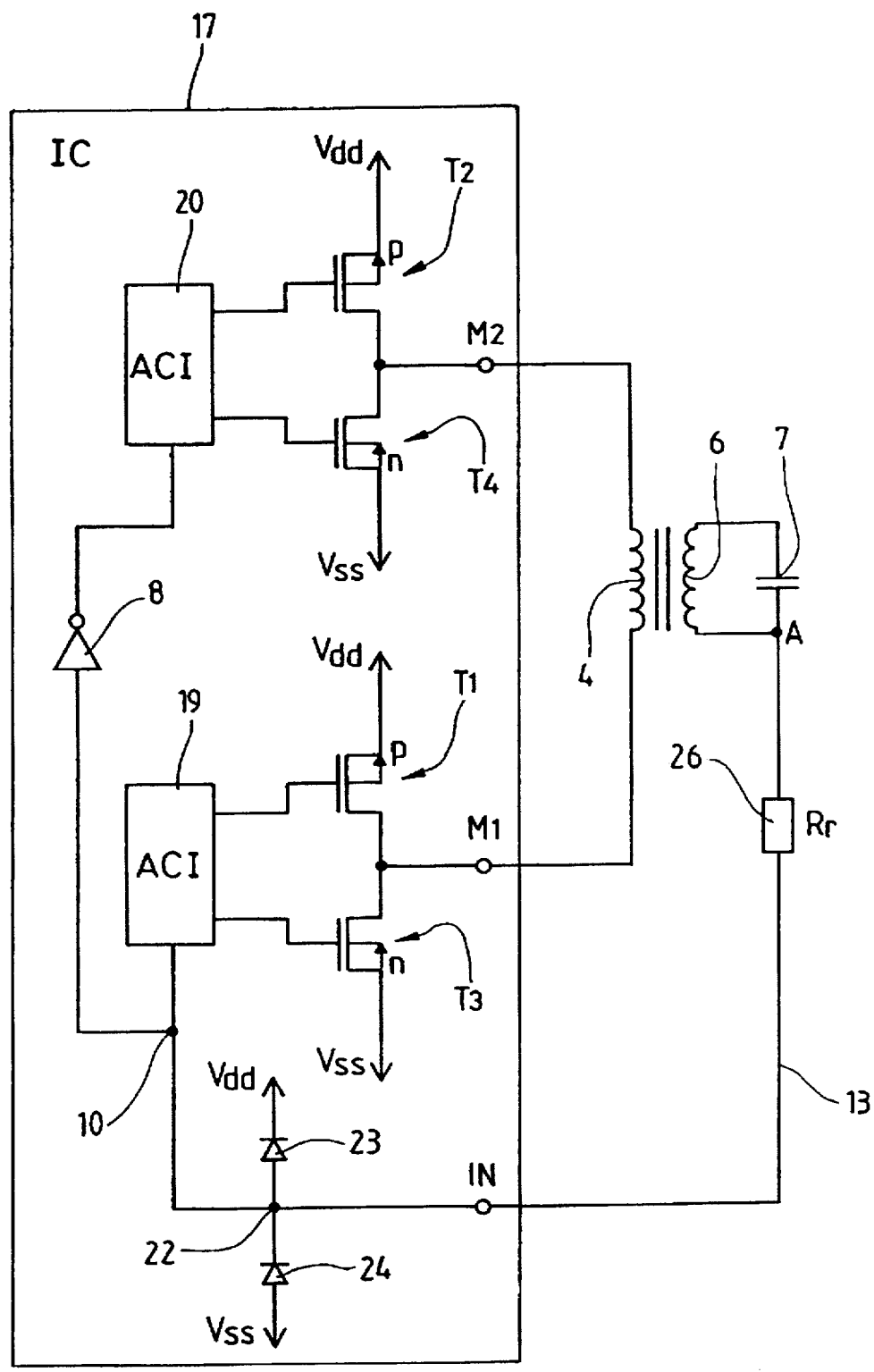
FIG. 3 is the diagram of a power supply circuit of an electroluminescent lamp according to a third embodiment of the present invention.

FIG. 3 shows a third embodiment of the present invention. As in the embodiment in FIG. 2, the components forming the power supply circuit according to the present embodiment are preferably intended to be integrated in a chip. Only transformer 4, 6 and a resistor referenced 26 are, in this example, realised in the form of components external to the integrated circuit chip. The reader will note, in particular, that the entire part of the circuit which is integrated in the chip, that is to say, the part enclosed by the frame referenced 17, may be identical to the corresponding part of the circuit of FIG. 2. In concrete terms, this means that one can use the same chip 17 to realise both the circuit of FIG. 2 and the circuit of FIG. 3.

In this third embodiment, instead of transmitting the potential of one of the armatures of a capacitor 15 which "mirrors" electroluminescent lamp 7 via feedback line 13, the potential of one of the electrodes of the electroluminescent lamp is transmitted directly.

The operating principle of the circuit according to this third embodiment of the present invention is very similar to that which has just been described in conjunction with FIG. 2. It is to be noted, however, that by reason of the transformation ratio, the voltage between the electrodes of the electroluminescent lamp is considerably higher than that present between the terminals of the mirror capacity 15 of the embodiment of FIG. 2. In order to avoid any risk of overvoltage at the input of the ACIs (or at diodes 23 and 24) a resistance 26 is preferably incorporated at feedback line 13. By using a resistance 26 of a sufficiently high value, a drop in voltage is achieved which removes all risk of overvoltage.

I claim:

1. A power supply circuit for an electroluminescent lamp (7) adapted to be supplied by a source of a continuous voltage supplied by a battery (2), said circuit comprising:

a transformer (4, 6) comprising on the one hand a primary winding (4) and on the other hand a secondary winding (6) which is adapted to be connected to two electrodes of said electroluminescent lamp (7) so as to form a resonant LC loop;

commutation means (T1, T2, T3, T4, 8, 19, 20) responding to a substantially periodic control signal to apply said continuous voltage to said primary winding (4) so as to generate therein an electric current of substantially periodic intensity, wherein the commutation means is adapted to respond to said control signal by switching cyclically between a first state, where said current circulates in the primary winding (4) in a first direction, and a second state where said current circulates in the primary winding (4) in the opposite direction; and enslaving means (13, 15) for providing said control signal, said enslaving means comprising:

a capacitor (15) connected by one (15b) of its terminals to one end of the primary winding (4) of the transformer and adapted to be connected in series with the primary winding., to the terminals of the voltage source via the commutation means, and a feedback line (13) connected to said one (15b) of the terminals of the capacitor.

2. A power supply circuit for an electroluminescent lamp (7) adapted to be supplied by a source of a continuous voltage supplied by a battery (2), said circuit comprising:

a transformer (4, 6) comprising on the one hand a primary winding (4) and on the other hand a secondary winding (6) which is adapted to be connected to two electrodes of said electroluminescent lamp (7) so as to form a resonant LC loop;

commutation means (T1, T2, T3, T4, 8, 19, 20) responding to a substantially periodic control signal to apply said continuous voltage to said primary winding (4) so as to generate therein an electric current of substantially periodic intensity, wherein the commutation means is adapted to respond to said control signal by switching cyclically between a first state, where said current circulates in the primary winding (4) in a first direction, and a second state where said current circulates in the primary winding (4) in the opposite direction; and a feedback line forming a connection between the transformer and the commutation means to transfer the control signal to said commutation means;

wherein said commutation means comprises two pairs of switching elements (T1, T2, T3, T4), the first and the second elements of a first pair being connected between, on the one hand, a first end of the primary winding (4) and, on the other hand, respectively the positive terminal and the negative terminal of the voltage source, and the first and the second elements of the other pair being connected between, on the one hand, the other end of the primary winding and, on the other hand, the positive terminal and the negative terminal of the voltage source respectively, the commutation means being also arranged so that when it is in said first state, the first element of the first pair conducts, whereas the second is blocked and the first element of the second pair is blocked whereas the second conducts, and, when the commutation means is in said second state, the switching elements which conduct in said first state are blocked and the switching elements which are blocked in said first state conduct.

3. The power supply circuit according to claim 2, wherein said switching elements (T1, T2, T3, T4) are switching transistors.

4. A power supply circuit for an electroluminescent lamp (7) adapted to be supplied by a source of a continuous voltage supplied by a battery (2), said circuit comprising:

a transformer (4, 6) comprising on the one hand a primary winding (4) and on the other hand a secondary winding (6) which is adapted to be connected to two electrodes of said electroluminescent lamp (7) so as to form a resonant LC loop;

commutation means (T1, T2, T3, T4, 8, 19, 20) responding to a substantially periodic control signal to apply said continuous voltage to said primary winding (4) so as to generate therein an electric current of substantially periodic intensity, wherein the commutation means is adapted to respond to said control signal by switching cyclically between a first state, where said current circulates in the primary winding (4) in a first direction, and a second state where said current circulates in the primary winding (4) in the opposite direction; and a feedback line forming a connection between the transformer and the commutation means to transfer the control signal to said commutation means; and wherein the feedback line forms a connection between said primary winding and the commutation means.

5. The power supply circuit according to claim 4, wherein a capacitor (15) is connected by one (15b) of its terminals to one end of the primary winding (4) of the transformer and is adapted to be connected, in series with the primary winding, to the voltage source via said commutation means.

6. The power supply circuit according to claim 2, wherein the feedback line forms a connection between the secondary winding and said commutation means.

7. The power supply circuit according to claim 6, wherein a resistance is connected by one of its terminals to one end of the secondary winding of the transformer and is adapted to be connected in series with the feedback line.

8. The power supply circuit according to claim 4 or 5, wherein said commutation means comprises two pairs of switching elements (T1, T2, T3, T4), the first and the second elements of a first pair being connected between, on the one hand, a first end of the primary winding (4) and, on the other hand, respectively the positive terminal and the negative terminal of the voltage source, and the first and the second elements of the other pair being connected between, on the one hand, the other end of the primary winding and, on the other hand, the positive terminal and the negative terminal of the voltage source respectively, the commutation means being also arranged so that when it is in said first state, the first element of the first pair conducts, whereas the second is blocked and the first element of the second pair is blocked whereas the second conducts, and when the commutation means is in said second state, the switching elements which conduct in said first state are blocked and the switching elements which are blocked in said first state conduct.

9. The power supply circuit according to claim 8, wherein said switching elements (T1, T2, T3, T4) are switching transistors.

* * * * *